United States Patent
Sitter, Jr.

(10) Patent No.: US 9,482,853 B2
(45) Date of Patent: Nov. 1, 2016

(54) AFOCAL TELESCOPE CONFIGURED AS THREE OR FOUR MIRROR ANASTIGMAT FOR BACK-SCANNED IMAGERY

(71) Applicant: Raytheon Company, Waltham, MA (US)

(72) Inventor: David N. Sitter, Jr., Torrance, CA (US)

(73) Assignee: RAYTHEON COMPANY, Waltham, MA (US)

( * ) Notice: Subject to any disclaimer, the term of this patent is extended or adjusted under 35 U.S.C. 154(b) by 323 days.

(21) Appl. No.: 13/779,279

(22) Filed: Feb. 27, 2013

(65) Prior Publication Data

US 2014/0240820 A1    Aug. 28, 2014

(51) Int. Cl.
G02B 23/06 (2006.01)
G02B 23/02 (2006.01)
G02B 17/06 (2006.01)
G02B 13/14 (2006.01)
G01S 3/781 (2006.01)
G01S 3/786 (2006.01)

(52) U.S. Cl.
CPC ........... G02B 17/0642 (2013.01); G01S 3/781 (2013.01); G01S 3/786 (2013.01); G02B 13/146 (2013.01)

(58) Field of Classification Search
None
See application file for complete search history.

(56) References Cited

U.S. PATENT DOCUMENTS

| | | | |
|---|---|---|---|
| 5,071,240 A * | 12/1991 | Ichihara | G02B 17/0657 359/366 |
| 5,363,235 A | 11/1994 | Kiunke et al. | |
| 5,526,181 A * | 6/1996 | Kunick et al. | 359/613 |
| 6,016,220 A | 1/2000 | Cook | |
| 6,342,967 B1* | 1/2002 | Wilczynski | G02B 17/0804 359/364 |
| 6,426,834 B1 | 7/2002 | Braunecker et al. | |
| 7,119,969 B1 | 10/2006 | Amon et al. | |
| 8,102,583 B2* | 1/2012 | Cook | 359/224.1 |
| 2012/0176671 A1* | 7/2012 | Cook | 359/365 |
| 2012/0200700 A1* | 8/2012 | Bennett et al. | 348/143 |

FOREIGN PATENT DOCUMENTS

EP     2525235 A1    11/2012
WO    9921043 A1    4/1999

* cited by examiner

*Primary Examiner* — Stephone B Allen
*Assistant Examiner* — Ryan S Dunning
(74) *Attorney, Agent, or Firm* — Lando & Anastasi, LLP

(57) ABSTRACT

An afocal telescope configured for back-scanned imagery including a three mirror anastigmat and an optical element positioned proximate an intermediate image plane of the three mirror anastigmat and configured to adjust distortion characteristics of the afocal telescope to control image wander on a focal plane array. The optical element may be a field correcting lens or mirror, for example.

19 Claims, 17 Drawing Sheets

| Surface | Function | Radius, R | k | A | B | C | D | Yd | Alpha [deg] | Decenter/Tilt Type | Thickness | Material |
|---|---|---|---|---|---|---|---|---|---|---|---|---|
| 1050 | Entrance Pupil | Infinite | NA | NA | NA | NA | NA | 0 | 0 | None | 0.5 | Air |
| 1010 | Primary | -30 | -1.003402 | -4.30795E-08 | -6.66562E-12 | 0 | 0 | 11.40937 | 0 | Basic | -10.88476 | Refl |
| 1020 | Secondary | -10.95519 | -2.652056 | 6.27933E-06 | -8.80643E-08 | 6.90257E-10 | 0 | -0.01077 | -0.14777 | Decenter/Tilt and Return | 13.38476 | Refl |
| 1040 | Field Corrector | -80.31169 | 0 | 1.56045E-04 | -1.30095E-05 | 1.19321E-06 | -7.06054E-08 | -0.03461 | -0.35302 | Decenter/Tilt and Return | -15.38476 | Refl |
| 1030 | Tertiary | 24.91314 | -1.899877 | 5.94196E-06 | 1.15626E-09 | -1.19996E-10 | 0 | -0.01121 | -0.01030 | Decenter/Tilt and Return | 17.38476 | Refl |
| 1060 | Exit Pupil | Infinite | NA | NA | NA | NA | NA | 2.64346 | 0 | Basic | 0 | Air |

FOV is 3.5 deg circular
Entrance pupil diameter is 9
Magnification is 4.5X

*FIG. 11*

| Surface | Function | Radius | CC | A | B | C | D | Yd | Alpha [deg] | Decenter/Tilt Type | Thickness | Material |
|---|---|---|---|---|---|---|---|---|---|---|---|---|
| 1450 | Entrance Pupil | Infinite | NA | 0 | 0 | 0 | 0 | 0 | 0 | None | 15 | Air |
| 1410 | Primary | -30 | -1.029945 | 8.98217E-08 | 8.51967E-11 | -3.65872E-13 | 1.24470E-15 | 9.21594 | 0 | Basic | -12.31951 | Refl |
| 1420 | Secondary | -9.52971 | -8.046723 | 5.21204E-06 | 7.12782E-07 | -5.58599E-09 | 0 | 0.001418 | -0.03521 | Decenter/Tilt and Return | 3.88158 | Refl |
| 1440 | Field lens | 32.11061 | 0 | 0 | 0 | 0 | 0 | -0.06362 | 22.06127 | Decenter/Tilt and Return | 0.14010 | ZnSe |
| 1440 | Field lens | 42.30266 | 0 | 1.79060E-03 | -2.40651E-04 | 7.12899E-05 | -1.08132E-05 | -0.000684 | 22.06127 | Decenter/Tilt and Return | 9.54784 | Air |
| 1430 | Tertiary | -14.84421 | -0.997966 | -1.12577E-05 | -6.43029E-08 | -2.26033E-10 | 0 | -0.02947 | -0.19795 | Decenter/Tilt and Return | -12.03237 | Refl |
| 1460 | Exit Pupil | Infinite | NA | 0 | 0 | 0 | 0 | 2.052485 | 0 | Basic | NA | Air |

FOV is 3.5 deg circular
Entrance pupil is 9 diameter
Magnification is 4.5X

*FIG. 15*

AFOCAL TELESCOPE CONFIGURED AS THREE OR FOUR MIRROR ANASTIGMAT FOR BACK-SCANNED IMAGERY

BACKGROUND

In order to increase the integration time for a scanned two-dimensional (2-D) imaging sensor, the technique of back-scanning is often used to provide step/stare coverage. FIGS. 1A-1C illustrate this concept. In a sensor system, an afocal telescope 110 is configured to receive incoming electromagnetic radiation 120 and direct the radiation via imaging optics 130 to an imaging sensor, which is frequently a focal plane array (FPA) 140. Movement of the sensor system causes blurring of the image obtained by the FPA 140. Back-scanning with a mirror 150 behind the afocal telescope 110 provides an agile method to increase the integration time for the FPA 140 by at least partially compensating for movement of the sensor system. Specifically, as the sensor system moves, the back-scan mirror 150 attempts to hold the image stable on the FPA 140 during the integration time. This is illustrated in FIG. 1C, which shows the FPA's field of view 160 moving within the angular field of view 170 of the afocal telescope 110 as a result of the back-scanned motion 180 during the exposure. Thus, the larger sensor system may be scanned at the nominal rate while the smaller back-scan mirror 150 provides the fast motions to implement the step/stare function.

SUMMARY OF INVENTION

Aspects and embodiments are directed to afocal telescope configurations with controlled distortion characteristics that mitigate image blurring during back-scan imaging. According to certain aspects, an aspherical optical element is introduced near the intermediate image plane of the telescope to adjust the distortion of the telescope to mitigate the image blurring. As discussed in more detail below, one embodiment includes a four mirror anastigmat, and another embodiment includes a three mirror anastigmat with a field corrector lens.

According to one embodiment, an optical imaging system configured for back-scanned imagery comprises an imager including a focal plane array, an afocal telescope optically coupled to the imager, and configured to receive and collimate electromagnetic radiation and to direct the electromagnetic radiation via an exit pupil of the afocal telescope to the focal plane array of the imager, the focal plane array configured to form an image from the electromagnetic radiation, and the afocal telescope having an optical axis that passes through the exit pupil to the imager, a back-scan mirror optically coupled to the afocal telescope and the imager, positioned proximate the exit pupil of the afocal telescope, and configured to backscan the electromagnetic radiation to stabilize the image on the focal plane array, and an optical element positioned proximate an intermediate image plane of the afocal telescope and configured to adjust distortion characteristics of the afocal telescope to control image wander on the focal plane array for off-axis image points during the backscan.

In one example the afocal telescope is configured as a four mirror anastigmat including a primary mirror, a secondary mirror, a tertiary mirror, and the optical element, and the optical element is a field correcting mirror optically positioned between the secondary mirror and the tertiary mirror. The field correcting mirror may be a near-flat aspheric mirror, for example. In one example the primary mirror is positive powered, the secondary mirror is negative powered, and the tertiary mirror is positive powered. In another example the field correcting mirror is a deformable mirror, and the optical imaging system further comprises a processor coupled to the deformable mirror and configured to control a shape of the deformable mirror to control the image wander during the backscan. In another example the afocal telescope is configured as a three mirror anastigmat including a primary mirror, a secondary mirror, and a tertiary mirror. In this example, the optical element may be a field correcting lens group. The field correcting lens group may include an aspherical lens that is decentered with respect to the optical axis of the afocal telescope. The aspherical lens may comprise zinc selenide. In one example the afocal telescope is configured for dual-band operation and the field correcting lens group includes at least first and second lens elements of different materials. The afocal telescope may be configured for operation in the MWIR and LWIR spectral bands, for example. In one example the first lens element comprises zinc selenide, and the second lens element comprises zinc sulfide or germanium. The afocal telescope may be configured with the exit pupil being off-axis relative to the optical axis.

According to another embodiment, a method of back-scanned imaging comprises acts of collimating and directing electromagnetic radiation with an afocal telescope to an imager to form an image, the image being centered about an optical axis of the afocal telescope that passes through an exit pupil of the afocal telescope to the imager, back-scanning the electromagnetic radiation with a back-scan mirror optically coupled to the afocal telescope and positioned proximate the exit pupil of the afocal telescope to stabilize the image on the focal plane array, and adjusting distortion characteristics of the afocal telescope with an optical element positioned proximate an intermediate image plane of the afocal telescope to control image wander on a focal plane array of the imager for off-axis image points during the back-scanning operation.

In one example wherein the afocal telescope is configured as a three mirror anastigmat, the act of adjusting the distortion characteristics of the afocal telescope includes providing the optical element including a field correcting lens group positioned proximate the intermediate image plane of the three mirror anastigmat. The afocal telescope may be configured for dual-band operation, and providing the optical element may include providing the field correcting lens group including at least two lens elements of different materials. In another example wherein the afocal telescope is configured as a four mirror anastigmat including the optical element, the act of adjusting the distortion characteristics of the afocal telescope includes providing the optical element including a field correcting mirror. The field correcting mirror may be a deformable mirror, and adjusting the distortion characteristics of the afocal telescope may include controlling, with a processor, a shape of the deformable mirror.

According to another embodiment an optical imaging system configured for back-scanned imagery comprises an imager including a focal plane array, an afocal telescope optically coupled to the imager, and configured to receive and collimate electromagnetic radiation and to direct the electromagnetic radiation via an exit pupil of the afocal telescope to the focal plane array of the imager, the focal plane array configured to form an image from the electromagnetic radiation, and the afocal telescope having an optical axis that passes through the exit pupil to the imager, a back-scan mirror optically coupled to the afocal telescope and the imager, positioned proximate the exit pupil of the afocal telescope, and configured to backscan the electromagnetic radiation to stabilize the image on the focal plane array, and means for adjusting the distortion characteristics of the afocal telescope to control image wander on the focal plane array for off-axis image points during the backscan.

In one example the means for adjusting includes one of a field correcting lens group and a field correcting mirror positioned proximate an intermediate image plane of the afocal telescope.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 11 is a table providing an optical prescription for one example of the afocal telescope of FIG. 10 according to aspects of the invention;

FIG. 15 is a table providing an optical prescription for one example of the afocal telescope of FIG. 14 according to aspects of the invention;

DETAILED DESCRIPTION

Figure 1A:
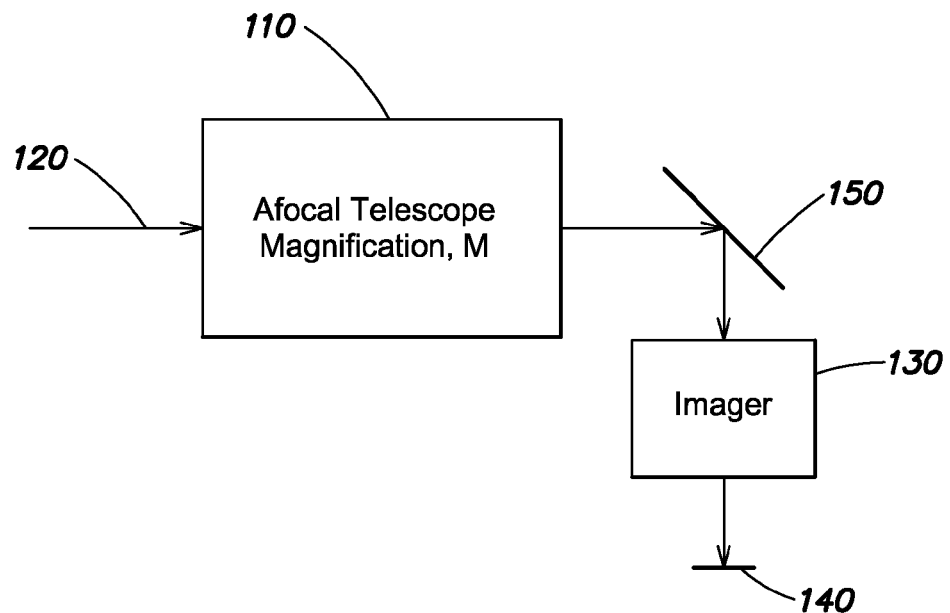
FIG. 1A is a schematic diagram of one example of a step/stare sensor configuration including an afocal telescope and a back-scan mirror.
Figure 1B:
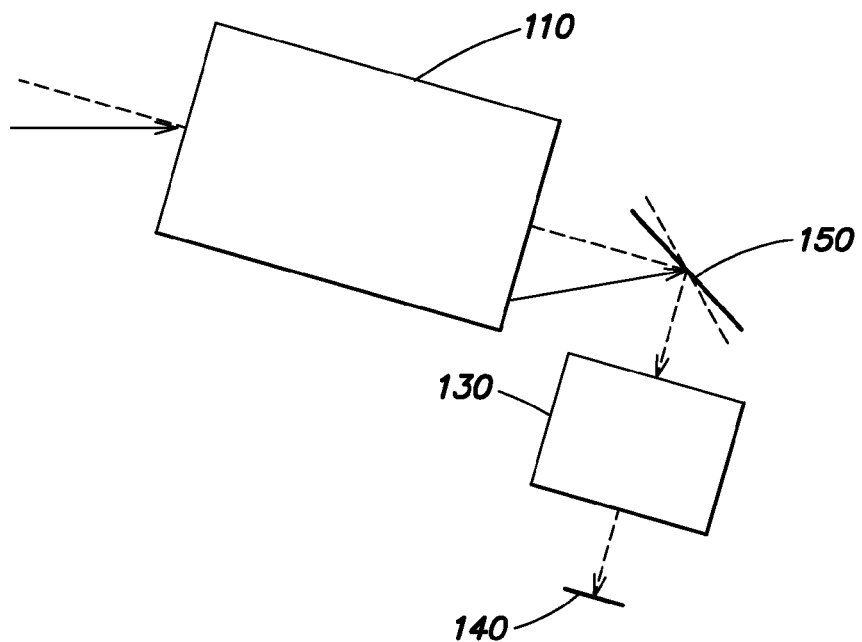
FIG. 1B is a schematic diagram illustrating the technique of back-scanning applied to the system of FIG. 1A.
Figure 1C:
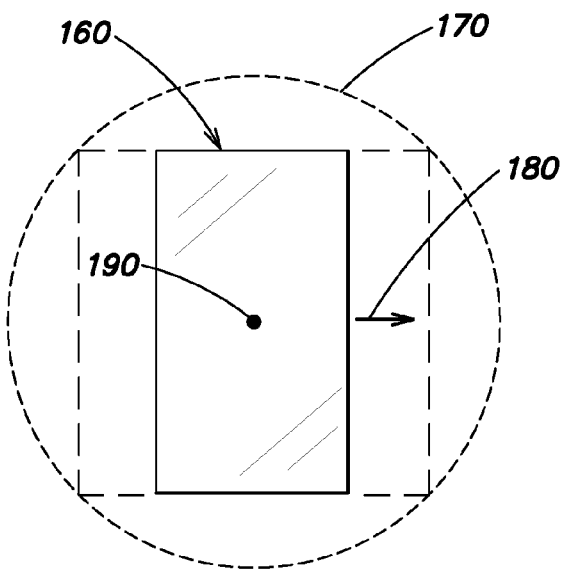
FIG. 1C is a schematic diagram illustrating back-scanned motion of the FPA's field of view within the angular field of view of the afocal telescope for the system of FIGS. 1A and 1B.

In the context of step/stare scanning systems that include a back-scan mirror positioned behind an afocal telescope, image blurring can occur for off-axis field points during the exposure/integration time. Referring again to FIG. 1C, although the back-scan mirror can hold one field point 190 relatively stable on the focal plane array (FPA), all other field points may wander during the exposure due to imaging distortion characteristics of the afocal telescope. Step/stare systems are widely used; however, this problem of image blurring due to off-axis field point wander (referred to herein as image wander) is not well recognized. As demonstrated below, the effect of image wander is more significant as the afocal magnification, angular field of view (FOV), and pixel count of the FPA increase. According to certain aspects and embodiments discussed below, blurring may be mitigated by introducing an optical element in the afocal telescope near the intermediate image to adjust the distortion characteristics of the telescope. In one embodiment, a field lens group is introduced into a three-mirror anastigmat to provide the correction. In another embodiment, the afocal telescope is configured as a four-mirror anastigmat which has sufficient degrees of freedom to address the issue of image blurring due to wander.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Afocal telescopes are generally optimized to have zero distortion based on the angular relationship between rays entering the telescope ($\theta_i$) and leaving the telescope ($\theta_o$) satisfying the following equation:

$$\tan(\theta_i) = M \tan(\theta_o) \quad (1)$$

In Equation (1), M is the magnification of the telescope. The relationship of Equation (1) ensures distortion-free images (e.g., lines image to lines). However, when a back-scan mirror is placed behind the afocal telescope, this relationship introduces image wander or blur for off-axis field points during the exposure. The amount and significance of the blurring depends on the magnification of the afocal telescope, the angular field of view, and the number of pixels (on the FPA) across the field of view. Imaging distortion aberrations may also introduce additional image blurring. It is to be appreciated that for a system that does not implement back-scanning, the imaging distortion of an afocal telescope is typically a separate issue from image quality. For example, the image may be sharp, but appear to be distorted. For instance, on-axis lens systems typically display symmetrical pincushion or barrel distortion. Afocal telescopes that are designed with off-axis pupils or with an offset field of view may have more complicated distortion functions.

Figure 2:
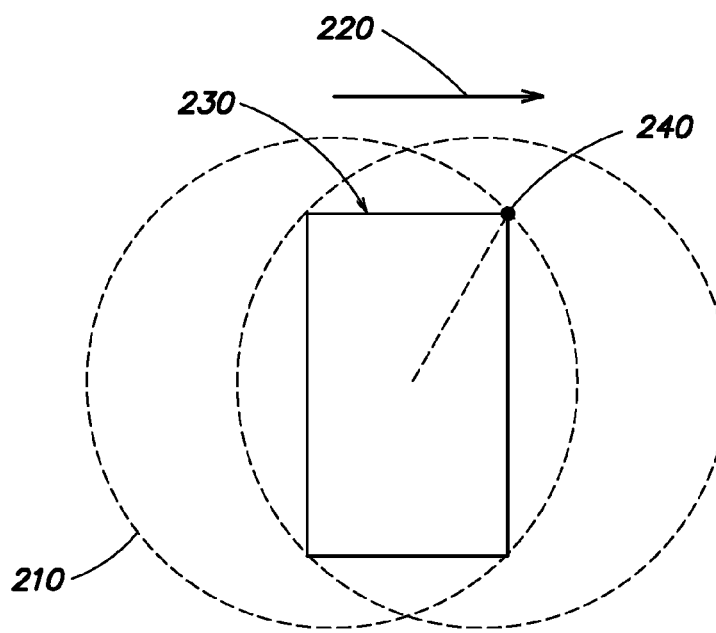
FIG. 2 is a diagram illustrating an example of a sensor's field of view in object space.

Referring to FIG. 2, there is illustrated a schematic representation of the sensor system's field of view in object space. The afocal telescope's field of view 210 is scanned (as represented by arrow 220) while the back-scanned mirror 150 moves to keep the FPA's field of view 230 fixed during the integration time (also referred to as exposure time). FIG. 2 shows a point object 240 at the corner of the field of view 230. The point target 240 effectively sweeps through the telescope's field of view 210 during the back-scan operation. Depending on the nature of the imaging distortion introduced by the afocal telescope 110, the point target 240 will wander on the FPA during the integration time, causing blurring.

Figure 3:
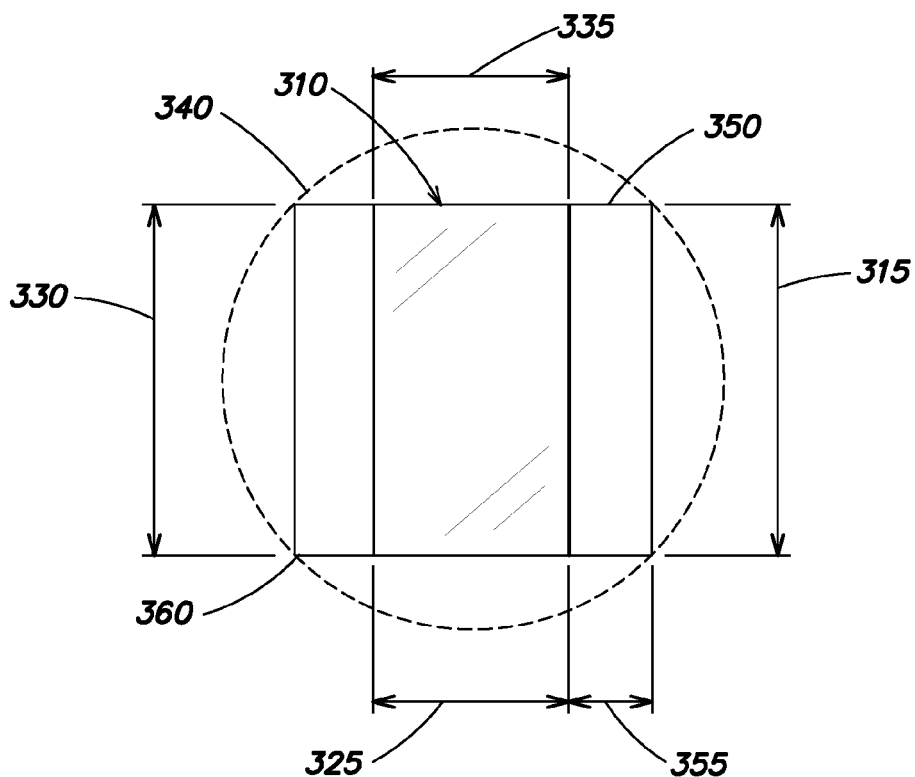
FIG. 3 is a diagram illustrating an example of an IRST sensor's field of view in object space.
Figure 4:
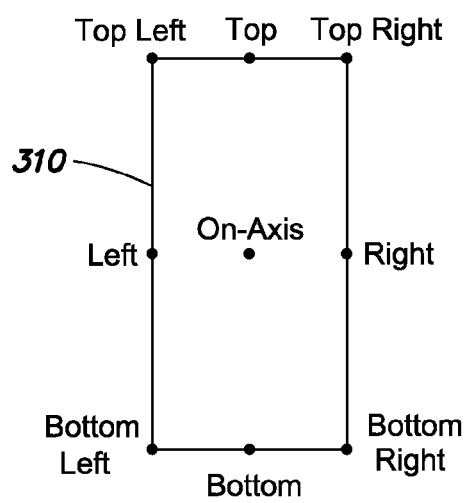
FIG. 4 is a diagram of the IRST sensor's field of view of FIG. 3 showing a plurality of field points.

To further demonstrate the issue of image wander, the following example considers the case of an infrared search and track (IRST) sensor. FIG. 3 illustrates an example of the field of view 310 of an exemplary IRST sensor in object space. FIG. 4 is a corresponding illustration of the field of view 310 showing the locations of a plurality of field points (labeled top left, top, top right, left, on-axis, right, bottom left, bottom, and bottom right). In this example the focal plane array is a high definition format (1280 pixels vertical (315) by 720 pixels horizontal (325)), and the nominal field of view is 1.4° horizontal (335) by 2.5° vertical (330). The afocal telescope has a larger field of view 340 in which the IRST field of view 310 is back-scanned. In the illustrated example, the azimuth back-scan 350 is ±0.55 degrees, or ±39% of the azimuth field of view, corresponding to 280 pixels (355).

Generally, the back-scan mirror is configured to hold a center point of the field of view 310 fixed during the exposure. As a result, distortion is greatest at the corners of the image. For the above-given values of the example illustrated in FIGS. 3 and 4, the radius from the center of the IRST frame 310 (on-axis field point) to the corner is 734 pixels. High definition arrays such as that of FIG. 3 require a tight control on the imaging distortion. A single pixel shift at the corner 360 of the image represents only a 0.14% change in the radius. Similarly, a single pixel shift due to image rotation is introduced by only 1.4 milliradians (mrad) of rotation.

Figure 5:
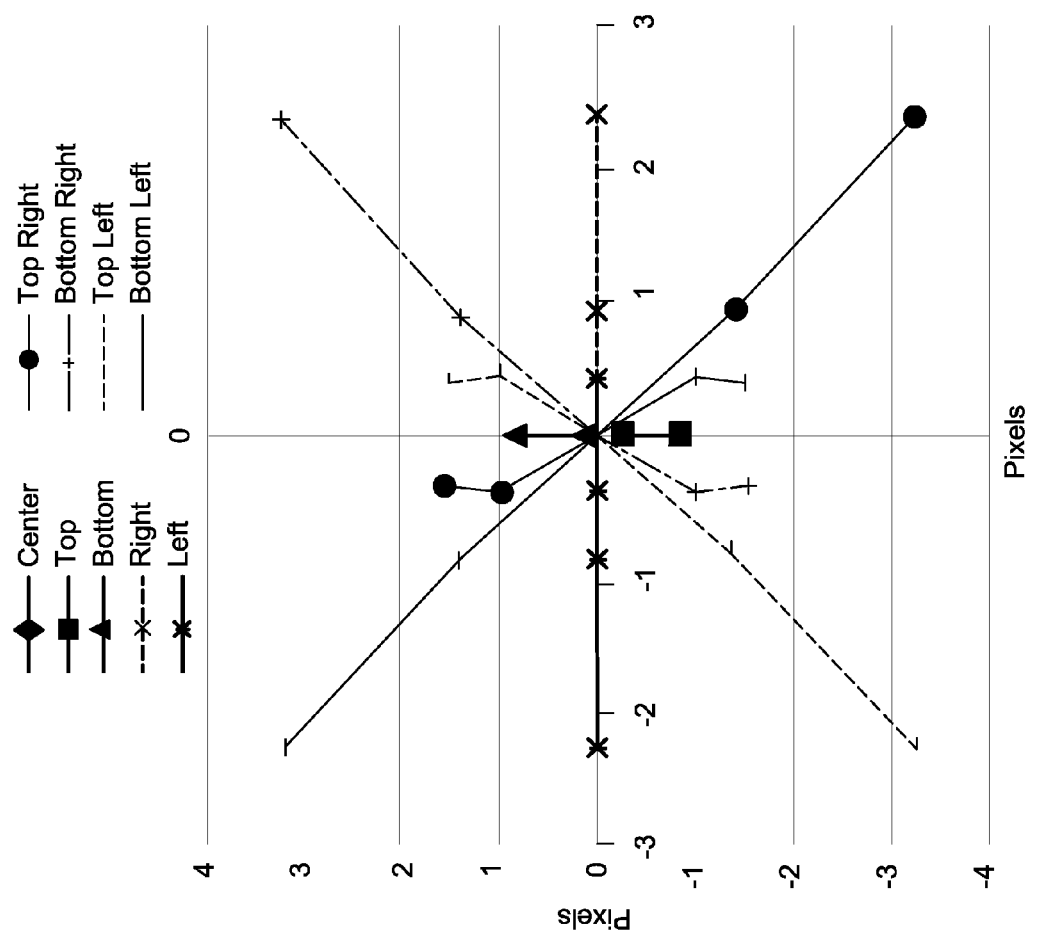
FIG. 5 is a graph illustrating image point wander for the field points of FIG. 4 for an ideal 6× magnification afocal telescope.
Figure 6:
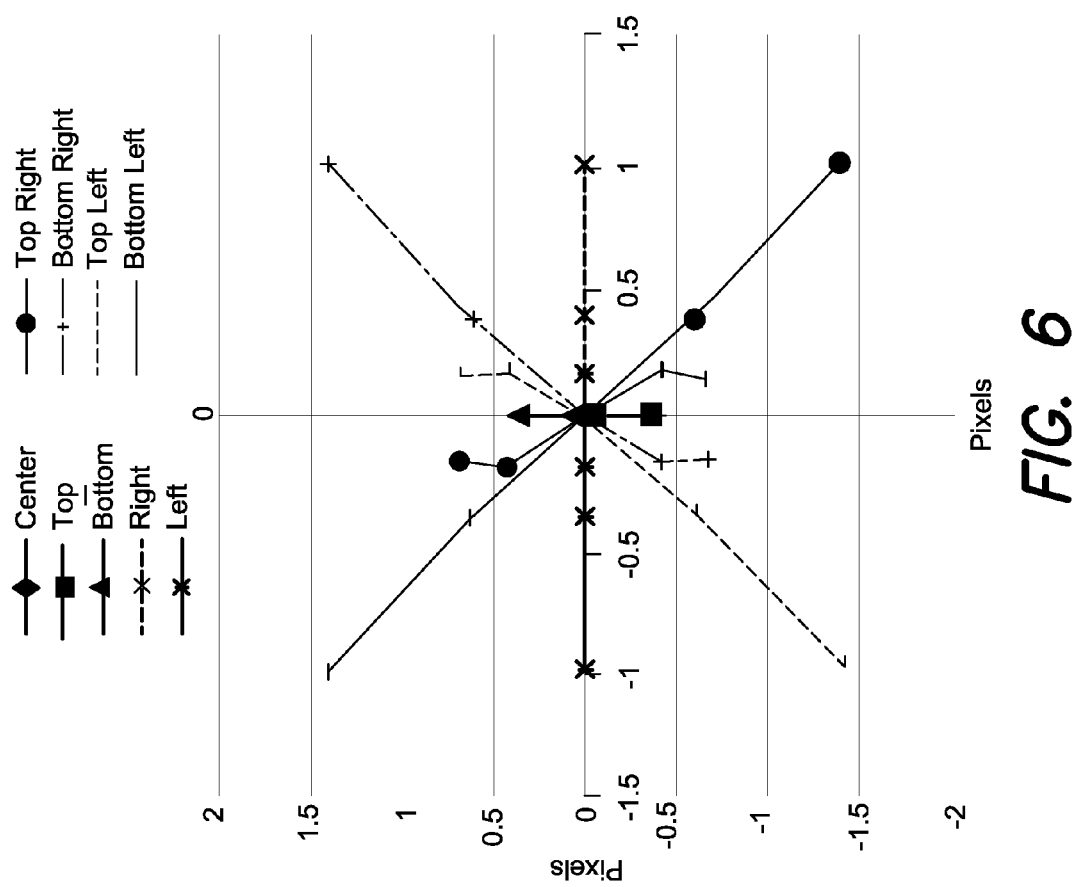
FIG. 6 is a graph illustrating image point wander for the field points of FIG. 4 for an ideal 4× magnification afocal telescope.

FIGS. 5 and 6 illustrate the simulated wander of the field points about their nominal position on the FPA field of view 310 as the image is back-scanned through the field of view of an afocal telescope with the ideal distortion-free imaging relationship given by Equation (1). The amount of image wander for field points at the edges of the image is multiple pixels. FIG. 5 shows the image point wander about the nominal position (for the field points of FIG. 4) plotted for an "ideal" 6× magnification afocal telescope with no distortion. In this example, the back-scan is ±0.5° in object space. Each point on the lines represents a 0.25° backscan increment or step. The FPA is 1280 by 720 pixels. FIG. 6 shows the image point wander about the nominal position (for the field points of FIG. 4) plotted for an "ideal" 4× magnification afocal telescope with no distortion. In this example, the back-scan is again ±0.5° in object space, and each point on the lines represents a 0.25° backscan step. The FPA is 1280 by 720 pixels. Comparing FIGS. 5 and 7 (and noting the scale change) demonstrates that the amount of image wander is larger for higher afocal magnifications and that the relationship is not linear with magnification.

Figure 7:
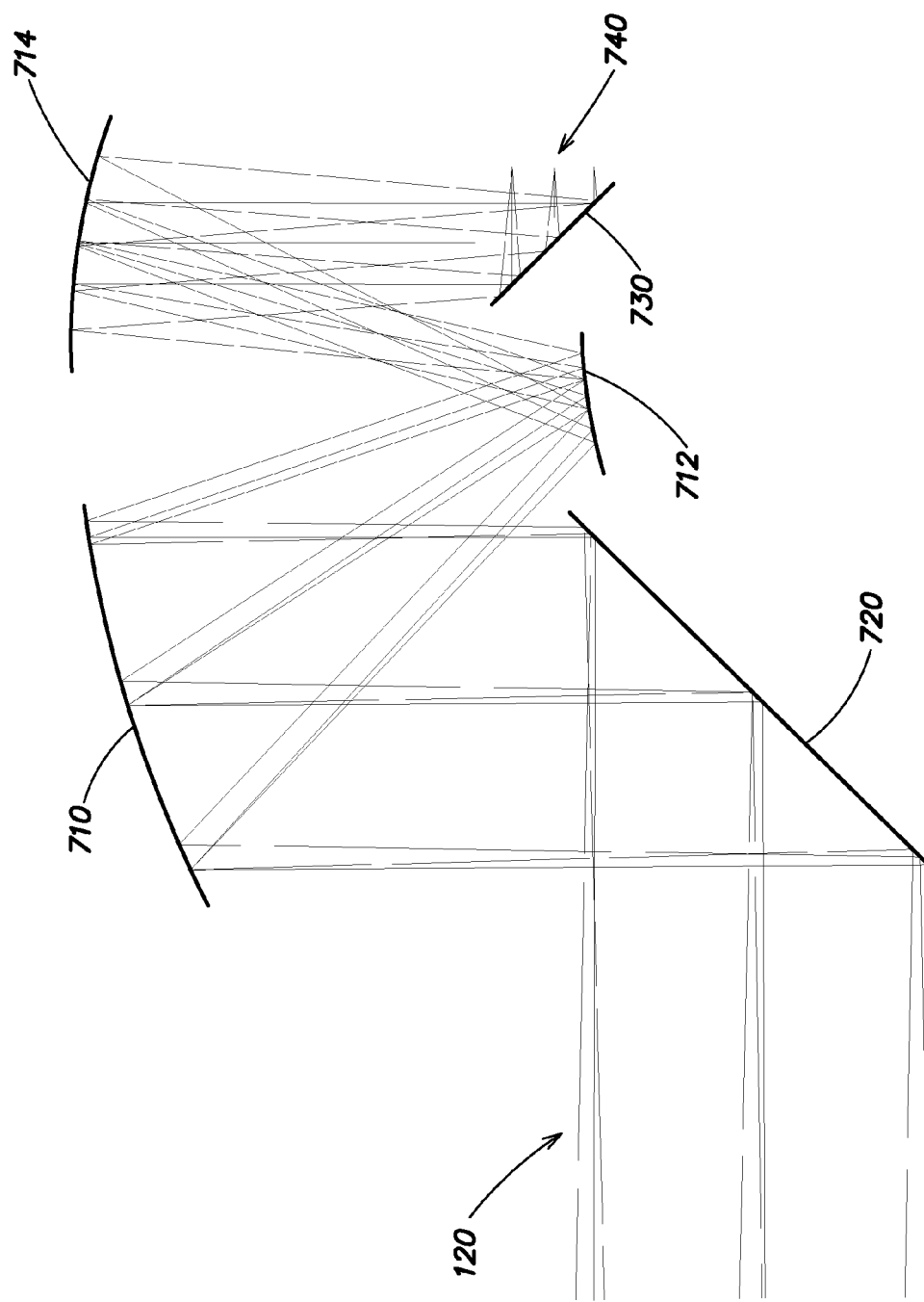
FIG. 7 is a ray trace of one example of an afocal telescope including a three mirror anastigmat.

FIGS. 5 and 6 illustrate simulated image point wander for examples of "ideal" distortion-free afocal telescopes. However, as discussed above, practical afocal telescope designs may have positive (pincushion) or negative (barrel) distortion which may make the image wander worse or better. FIG. 7 is a ray trace of an example of an afocal telescope with an off-axis pupil designed for an IRST system with a nominal 2.4° by 1.35° field of view. In this example, the afocal telescope includes a three mirror anastigmat comprised of a primary mirror 710, a secondary mirror 712, and a tertiary mirror 714. Incoming electromagnetic radiation 120 is directed to the three mirror anastigmat by a scan mirror 720. The afocal telescope further includes a coude path fold mirror 730. Back-scan optics may be located at the location identified by arrow 740, which may be at or near the exit pupil of the afocal telescope. In this example, the afocal telescope has an entrance pupil diameter of approximately 5 inches, and 4× magnification. This example three mirror anastigmat has relatively small, positive (pincushion type) distortion.

Figure 8:
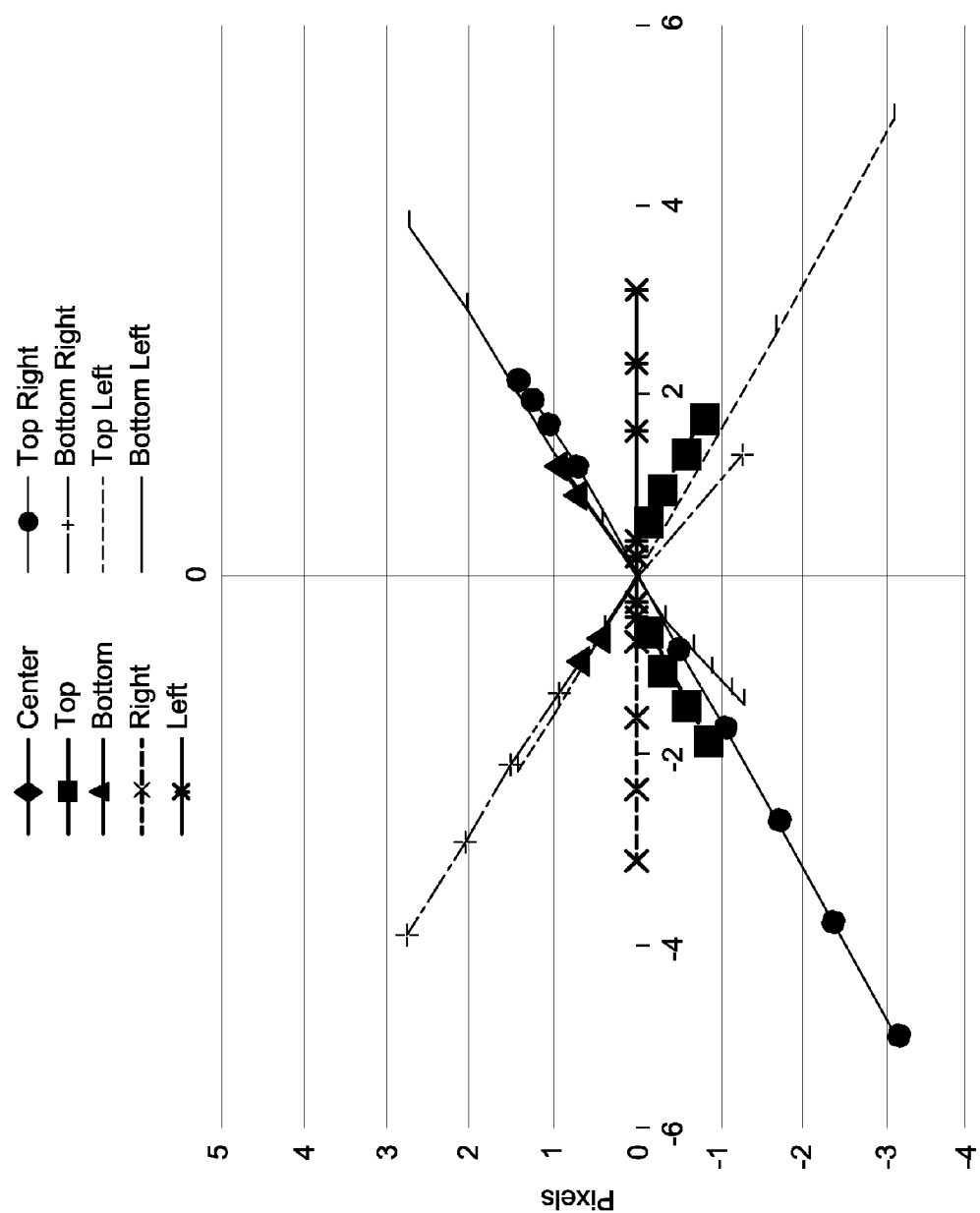
FIG. 8 is a graph illustrating image point wander for the field points of FIG. 4 and for the afocal telescope of FIG. 7.

FIG. 8 illustrates image point wander for the example afocal telescope of FIG. 7 simulated using the field points and nominal IRST sensor field of view 310 of FIG. 4. FIG. 8 illustrates the image wander for ±0.5° back-scan in object space. The backscan increment between points along the lines is 0.1°. The FPA is 1280 by 720 pixels. As may be seen by comparison of FIG. 8 with FIG. 6, the amount of image wander for the afocal three mirror anastigmat of FIG. 7 is significantly larger than that for a 4× ideal telescope with zero distortion. As shown in FIG. 8, the image wander during exposure is several pixels and, in certain examples, is many times larger than the point spread function that the telescope of FIG. 7 may provide.

An alternative image mapping relationship for an afocal telescope is given by the following equation:

$$\theta_i = M\theta_o \quad (2)$$

Figure 9:
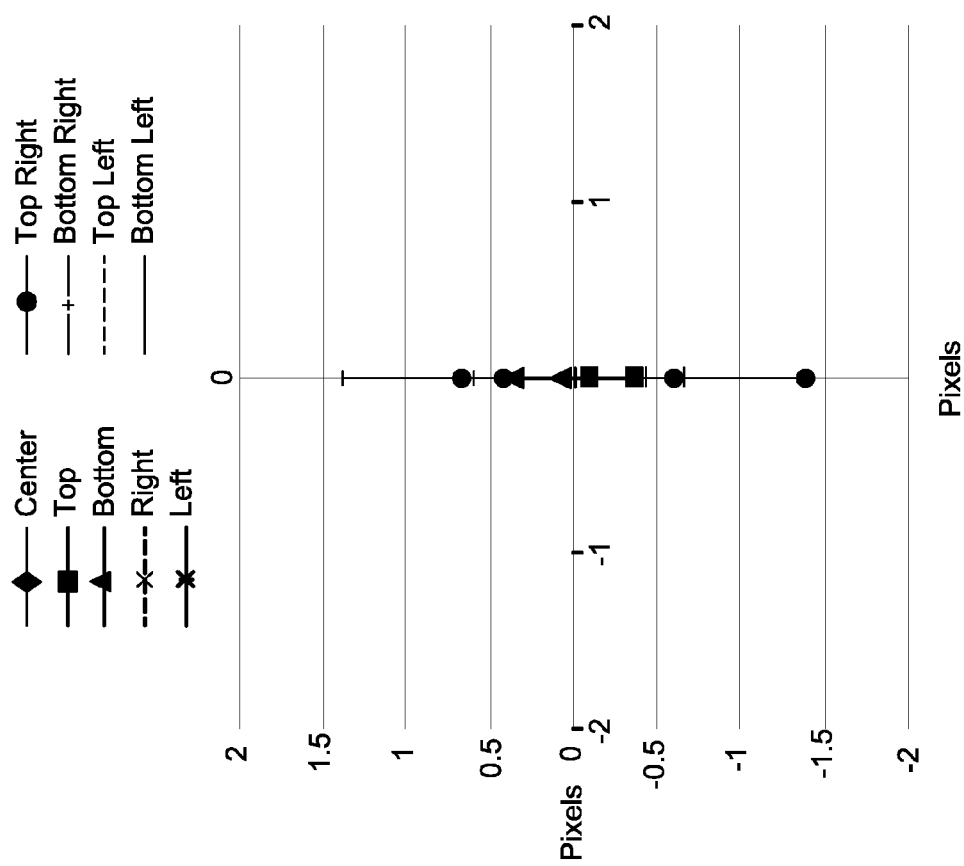
FIG. 9 is a graph illustrating image point wander measured in pixels for the field points of FIG. 4 for another example of an alternate ideal 4× magnification afocal telescope.

This configuration may minimize image wander for field points along a single axis. For example, an afocal telescope designed according to the image mapping relationship of Equation (2) introduces no image wander for image points along the scan direction (e.g., along the horizontal axis in FIG. 3). FIG. 9 illustrates simulated image point wander for a 4× magnification afocal telescope using the image mapping relationship of Equation (2), and for the field points of FIG. 4. FIG. 9 presents results for a simulated back-scan of −0.5° to +0.5° in object space. As may be seen in FIG. 9, off-axis image points above and below the x-axis (scan direction) wander almost entirely in the vertical direction. In addition, the image wander is multiple pixels for several field points.

According to aspects and embodiments, the problem of image wander during back-scanning may be mitigated by optimizing the imaging distortion of the afocal telescope to minimize the effect of image wander at multiple field points and over multiple configurations. This may be accomplished by inserting an optical element near the intermediate image in the afocal design to adjust the imaging distortion. This approach may be implemented for any afocal design, including reflective or refractive afocal telescopes.

According to one embodiment, a three mirror anastigmat is reconfigured as a four-mirror anastigmat by inserting a fourth mirror near the intermediate image position, and re-optimizing the optical form, including, for example, the size, position, power, and/or surface characteristics of all four mirrors. The resulting four mirror anastigmat may be configured to control the imaging distortion characteristics of the telescope to sufficiently reduce the image smearing effect of image wander.

Figure 10:
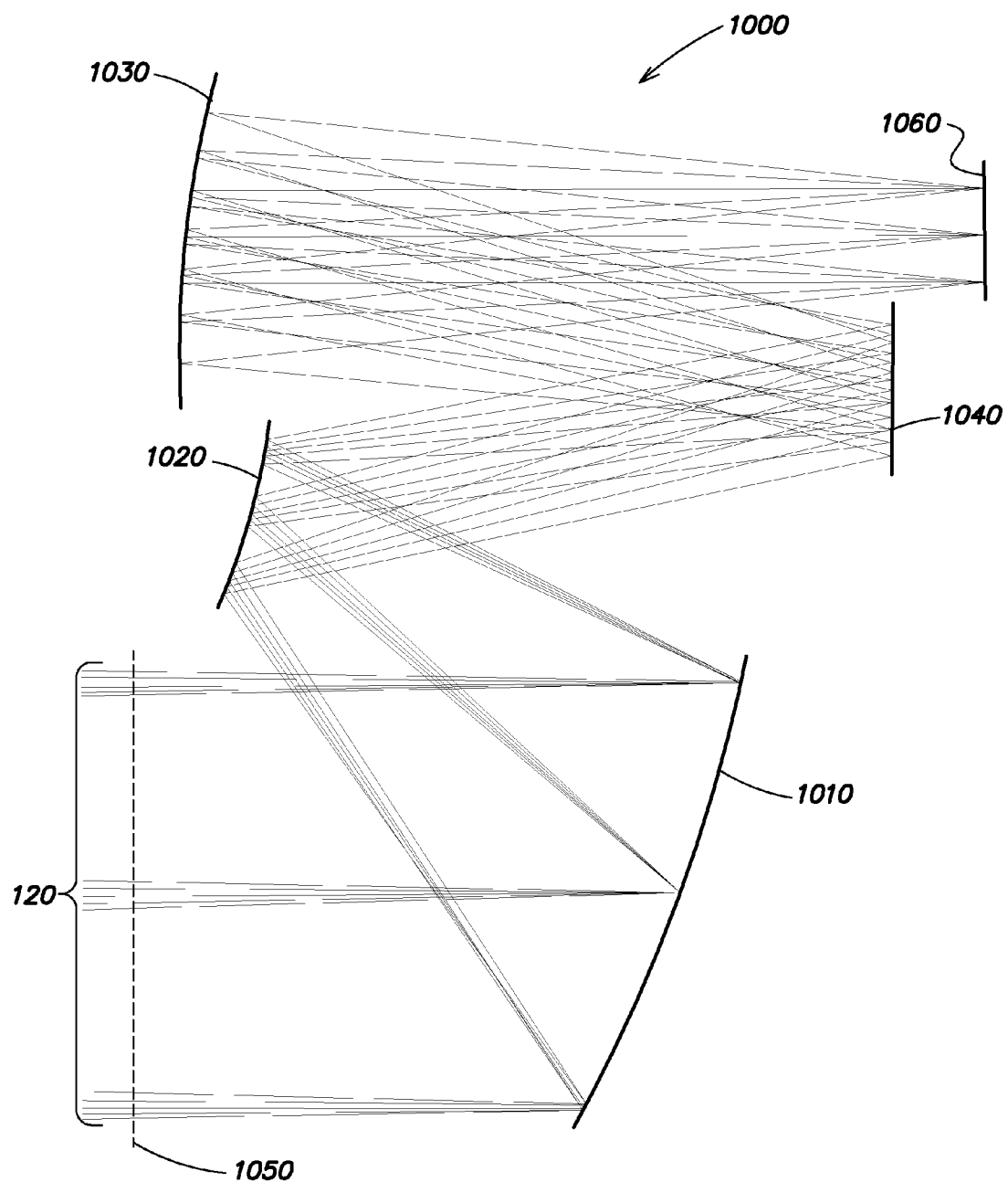
FIG. 10 is a ray trace of one example of an afocal telescope including a four mirror anastigmat according to aspects of the invention.

Referring to FIG. 10, there is illustrated a ray trace of one example of an afocal telescope including a four mirror anastigmat according to one embodiment. In this example, the telescope 1000 includes a primary mirror 1010, a secondary mirror 1020, and a tertiary mirror 1030. Together, the primary, secondary and tertiary mirrors receive electromagnetic radiation 120 via an entrance pupil 1050, and direct the radiation to the back-scan mirror 150 (see FIGS. 1A and 1B), which is typically positioned at or near the exit pupil 1060 of the afocal telescope. In the illustrated example, the primary mirror 1010 is a positive powered mirror, the secondary mirror 1020 is a negative powered mirror, and the tertiary mirror 1030 is a positive powered mirror. A field correcting mirror 1040 is positioned at or near the intermediate image plane of the three mirror anastigmat, thereby forming a four mirror anastigmat. In one embodiment, the field correcting mirror 1040 is a near-flat aspherical mirror. The exact shape of the field correcting mirror 1040 may be determined using a numerical optimization procedure to minimize image wander. In one example the four mirror anastigmat has a 9 inch aperture, 4.5× magnification and a 3.5° circular field of view specifically designed to reduce image blurring during back-scan.

FIG. 11 provides an optical prescription for this example of the afocal telescope of FIG. 10. The optical prescription may be generated using Equation (3) below, which is an industry standard and which would be known to those skilled in the art. It is to be appreciated however, that the prescription given in FIG. 11 is merely exemplary, and that the prescriptions of various embodiments of the afocal telescope 1000 are determined by the task to be performed by the optical system. In FIG. 11, the distance, offsets and tilts are with respect to the nominal optical axis of the system.

$$z = \frac{r^2/R}{1 + \sqrt{1 - (1+k)r^2/R^2}} + Ar^4 + Br^6 + Cr^8 + Dr^{10} \quad (3)$$

Figure 12:
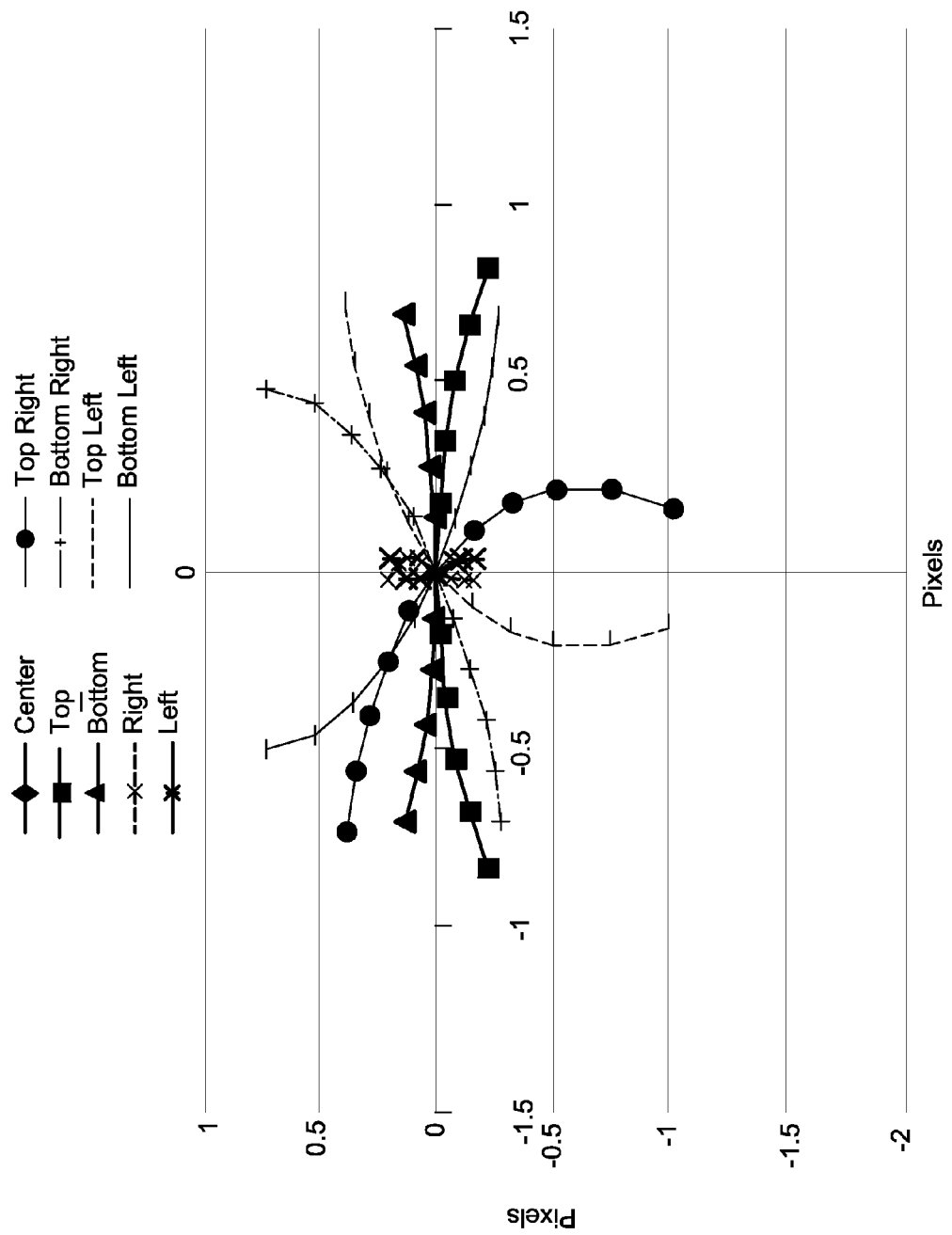
FIG. 12 is a graph illustrating image point wander measured in pixels of the field points of FIG. 4 for an example of the afocal telescope of FIG. 10.

FIG. 12 illustrates the image wander on a focal plane array for the exemplary four mirror anastigmat shown in FIG. 10 and corresponding to the prescription of FIG. 11. To produce the results shown in FIG. 12, a±0.5° back-scan in object space was simulated, with a zero degree system roll angle. The separation between points along the lines is 0.1°. As may be seen with reference to FIG. 12 and FIG. 6, the four mirror afocal telescope 1000 of FIG. 10 provides a significant reduction in image point wander during the back-scan operation. The image wander for this 4.5× telescope is smaller than the image wander for the "ideal" 4× telescope with zero distortion shown in FIG. 6.

Figure 13:
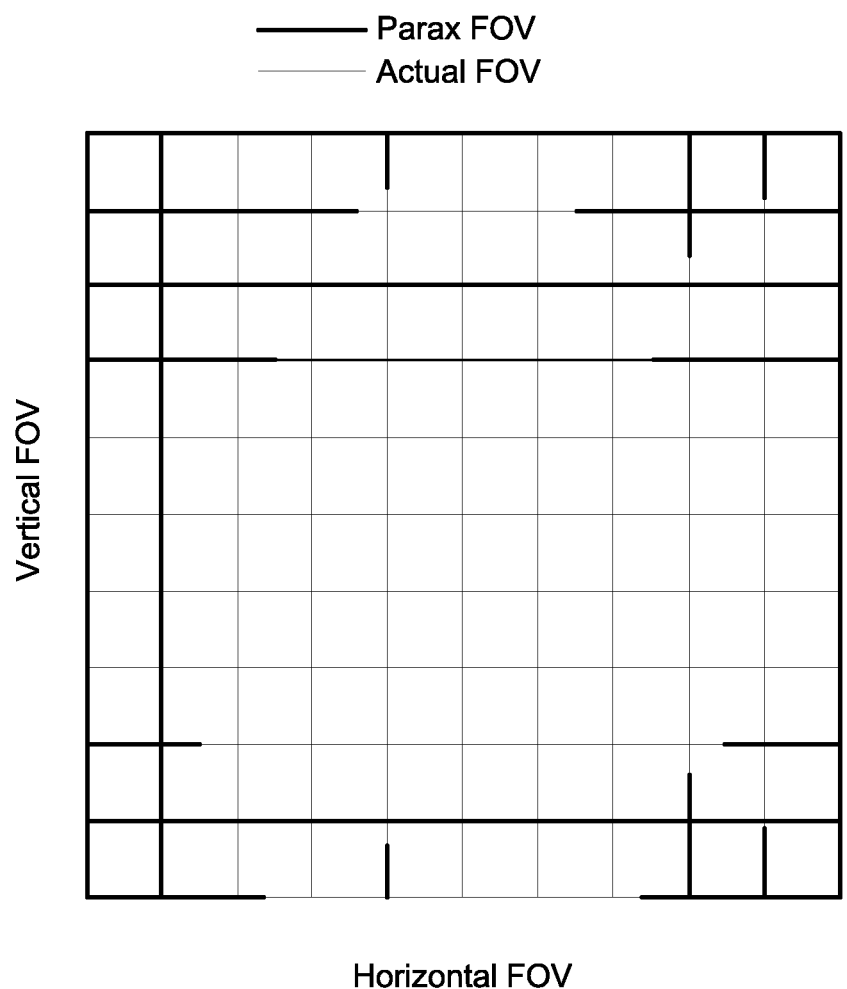
FIG. 13 is a diagram illustrating distortion characteristics of the example of the afocal telescope of FIG. 10.

FIG. 13 illustrates the imaging distortion of the four mirror anastigmat (corresponding to the telescope of FIG. 10 and Table 1) in object space. In FIG. 13, a square 2.5° field of view is illustrated. The distortion introduced to correct the image wander is relatively small. The resulting distortion is slightly negative (barrel distortion). FIG. 13 illustrates that the desired distortion for suppressing the image wander during the back-scan operation is slightly negative and departs from the "ideal" distortion-free imaging case. However, it is to be appreciated that the amount of distortion is very small and generally would not be objectionable even in imaging applications.

According to one embodiment, the field correcting mirror 1040 may be an adjustable or deformable mirror. As known to those skilled in the art, the shape of a deformable mirror may be adjusted under computer control to alter characteristics of the mirror. Accordingly, the optical system may include, or may be coupled to, a computing device, generally referred to herein as a processor, and which may be any type of processor, computer, or other computing/processing device capable of interfacing with and controlling the deformable mirror. The processor may be configured to adjust the shape of the deformable mirror to alter the distortion characteristics of the afocal telescope and control image wander for off-axis field points during the backscan operation, as discussed above. Use of a deformable mirror for the field correcting mirror 1040 may be advantageous in that the shape of the mirror can be controlled by the processor to variably adjust the distortion characteristics of the afocal telescope under different conditions and/or to provide finer control of the image wander.

Figure 14:
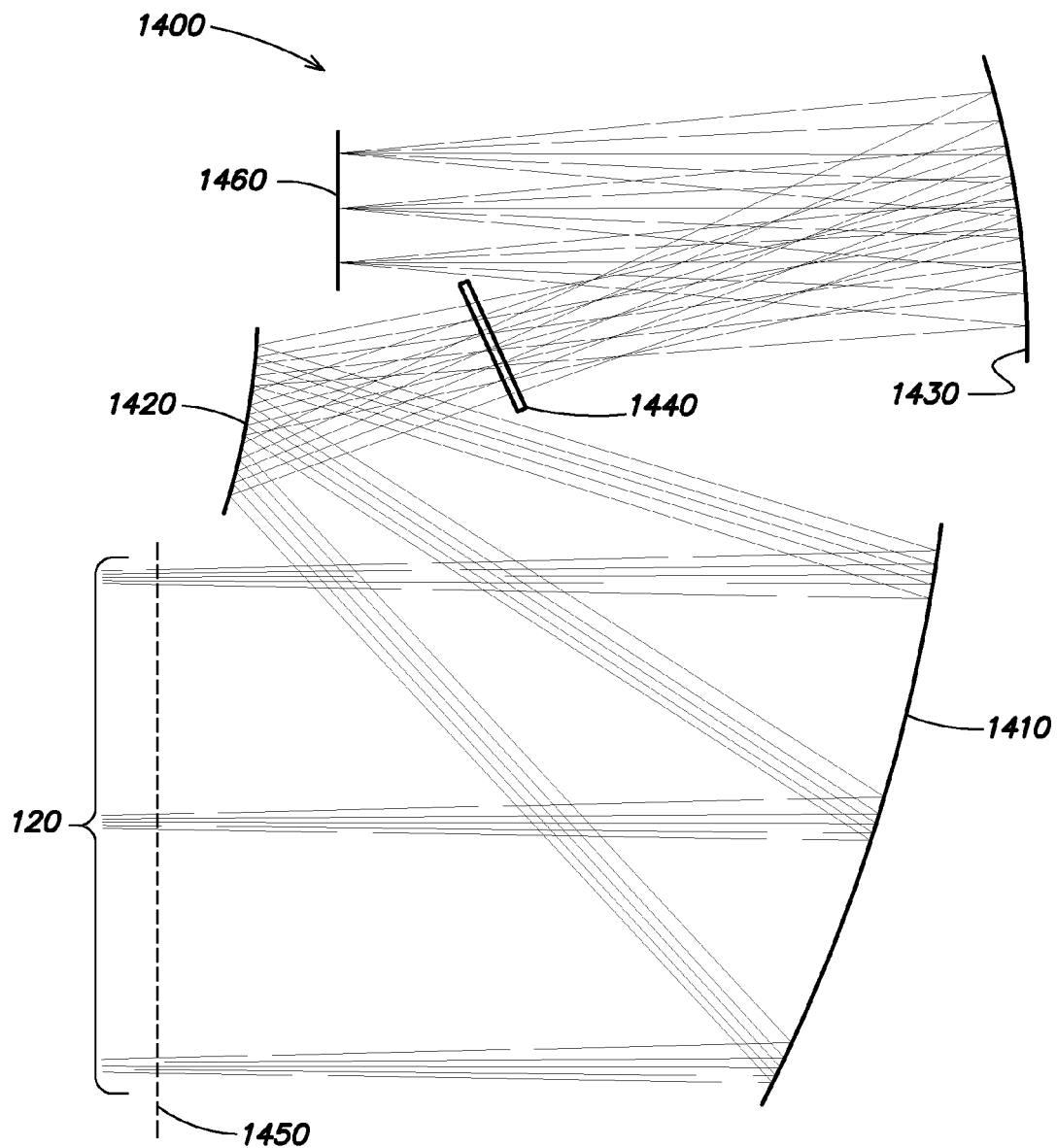
FIG. 14 is a ray trace of another example of an afocal telescope including a three mirror anastigmat and a field corrector lens according to aspects of the invention.

In some applications, the packaging associated with a four mirror anastigmat may not be desirable or convenient. According to another embodiment, image wander may be mitigated by using a field lens group inserted at or near the intermediate image plane of a three mirror anastigmat to adjust the distortion characteristics of the telescope. This configuration may be accommodated in a more compact package, relative to the four mirror configuration discussed above, and may therefore be preferred in applications where space is limited. Referring to FIG. 14 there is illustrated a ray trace of one example of an afocal telescope 1400 including a three mirror anastigmat and a field correcting lens group. The three mirror anastigmat is comprised of a primary mirror 1410, a secondary mirror 1420, and a tertiary mirror 1430. In one example, the primary mirror 1410 is a positive powered mirror, the secondary mirror 1420 is a negative powered mirror, and the tertiary mirror 1430 is a positive powered mirror. The three mirror anastigmat is configured to receive incident electromagnetic radiation 120 via an entrance pupil 1450, to form an intermediate image, and to re-image and collimate the electromagnetic radiation/intermediate image and direct it to the back-scan mirror 150 which may be positioned at or near the exit pupil 1460 of the afocal telescope 1400. A field correcting lens group 1440 is positioned near the intermediate image plane, as shown in FIG. 14. In one example, the field correcting lens group 1440 includes an aspherical lens that is positioned off-axis (de-centered) with respect to an optical axis of the three mirror anastigmat. The field correcting lens group 1440 may include one or more lenses made of a low dispersion material. In one example, the field correcting lens group 1140 includes at least one lens made of zinc selenide (ZnSe).

According to some embodiments, the afocal telescope 1400 may be configured for dual-band operation. For example, the afocal telescope 1400 may be configured for the midwave infrared (MWIR) spectral band (wavelengths in a range of approximately 3 μm to 5 μm) and the long wavelength infrared (LWIR) band (wavelengths in a range of approximately 8 μm to 12 μm). Accordingly, the field correcting lens group 1440 may include one or more lenses made of a material, such as ZnSe, for example, that has low dispersion in both the MWIR and LWIR spectral bands. In another example of a dual-band configuration, the field correcting lens group 1440 may include two or more lens elements of different materials, such as ZnSe (zinc selenide) and ZnS (zinc sulfide) or ZnSe and Ge (germanium). In some examples it may be preferable to select material(s) for the field correcting lens group 1440 that are operable at wavelengths of approximately 1 μm; the wavelength of many laser systems.

FIG. 15 provides an optical prescription for one example of the afocal telescope of FIG. 13. The optical prescription may be generated using Equation (3). It is to be appreciated however, that the prescription given in FIG. 15 is merely exemplary, and that the prescriptions of various embodiments of the afocal telescope 1400 are determined by the task to be performed by the optical system. In this example, the afocal telescope has a 9 inch aperture, 4.5× magnification, and a nominal 3.5° field of view. The optical design is optimized to minimize the image wander for a back-scan of ±0.5° in object space.

Figure 16A:
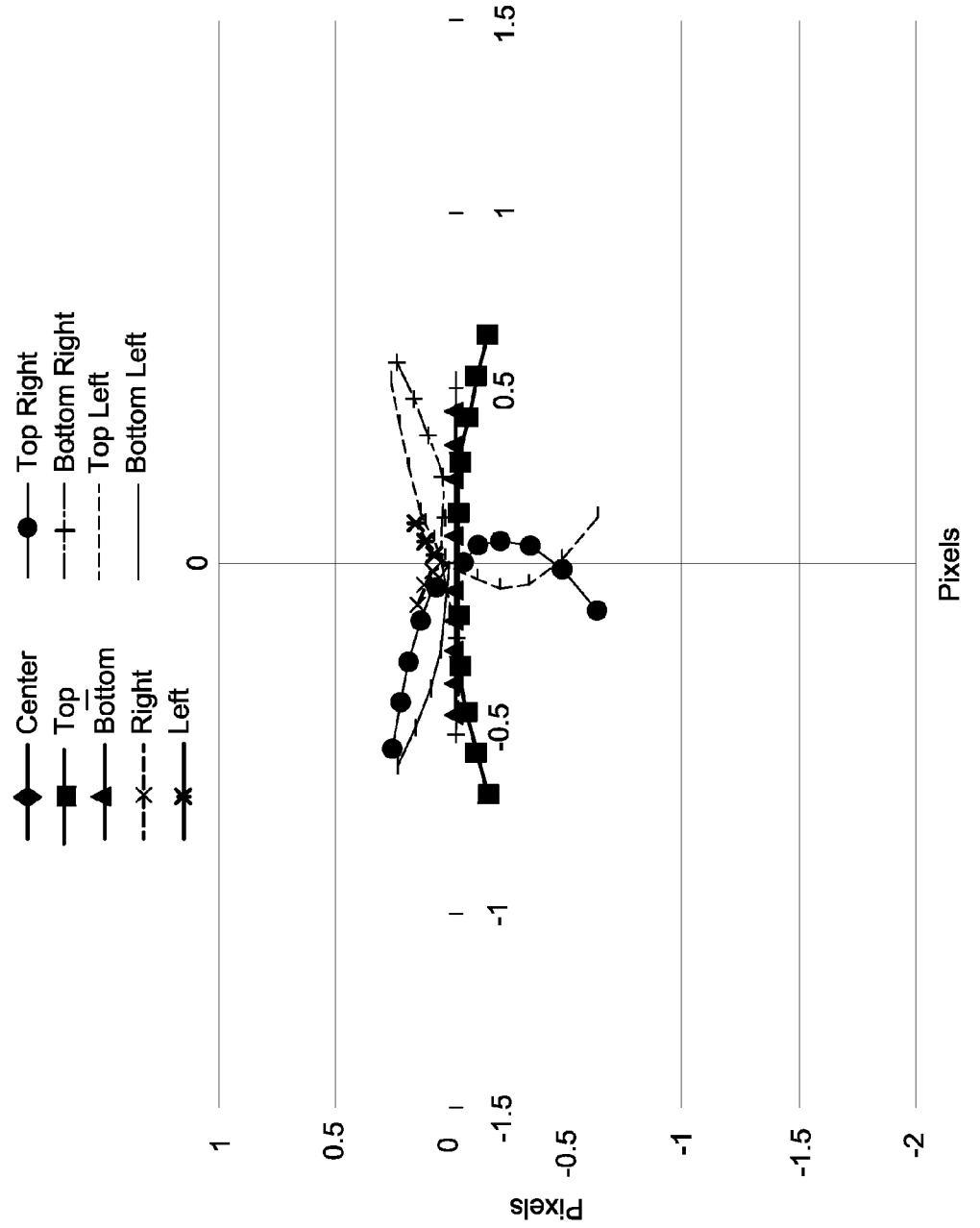
FIG. 16A is a graph illustrating image point wander measured in pixels of the field points of FIG. 4 for an example of the afocal telescope of FIG. 14 and a wavelength of 4.375 µm.
Figure 16B:
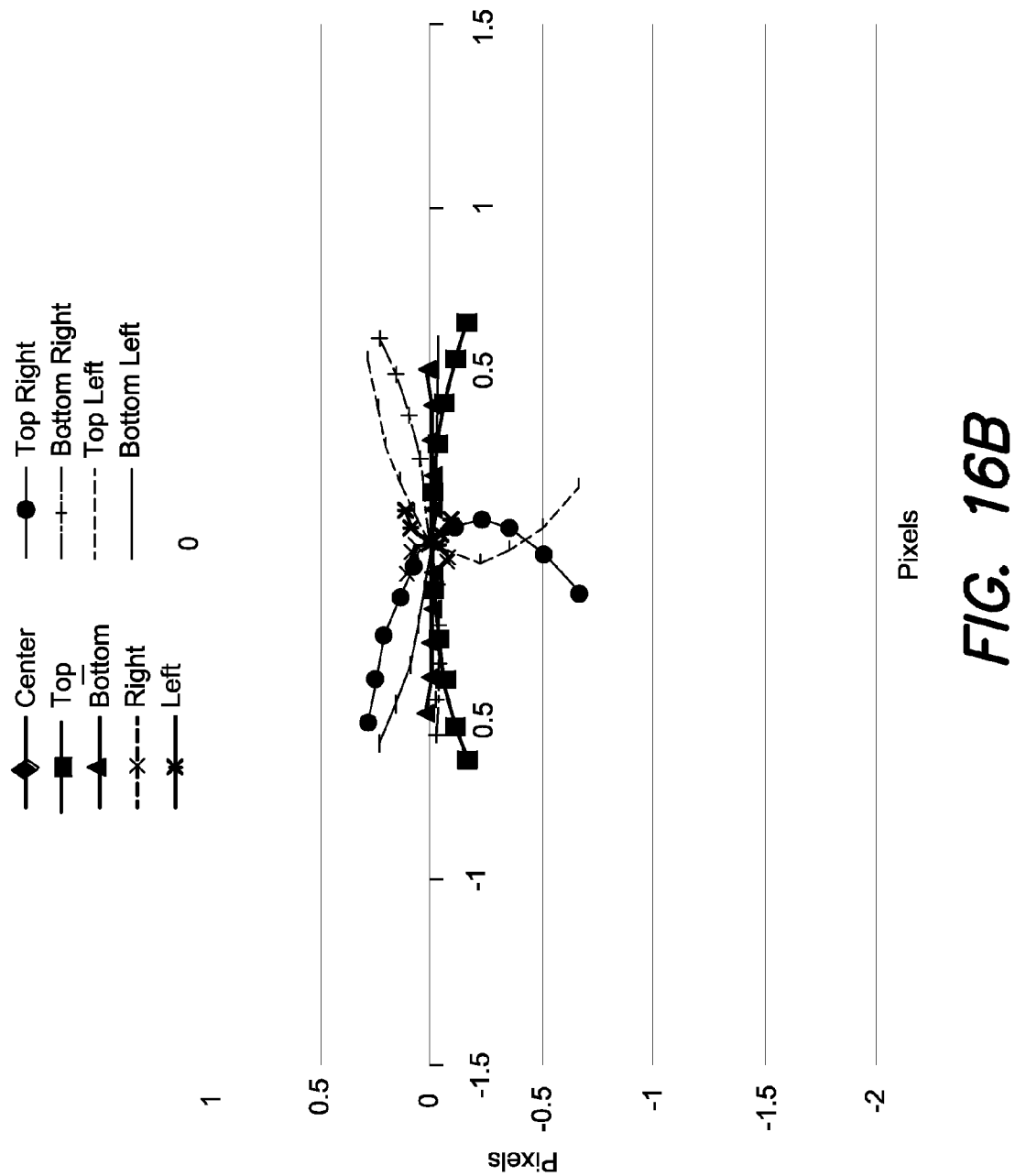
FIG. 16B is a graph illustrating image point wander measured in pixels of the field points of FIG. 4 for an example of the afocal telescope of FIG. 14 and a wavelength of 9 µm.

FIGS. 16A and 16B illustrate the image wander on the focal plane array for the three mirror anastigmat with the field lens corrector shown in FIG. 14 and corresponding to the optical prescription of FIG. 15. The results are presented for the field points and FPA field of view of FIG. 4. FIG. 16A shows the point source image wander on the FPA for the MWIR band (center wavelength of 4.375 μm), and FIG. 16B shows the point source image wander on the FPA for the LWIR band (center wavelength of 9 μm). For both FIGS. 16A and 16B, a ±0.5° back-scan in object space was simulated. The separation between points along the lines is 0.1°. The graphs of FIGS. 16A and 16B are for a 0° sensor roll condition; the results may be slightly worse for significant system roll angles, such as 30°, for example. As may be seen with reference to FIGS. 16A, 16B, and 6, the amount of image wander is significantly reduced. In addition, referring to FIGS. 16A and 16B, the results for the two bands are nearly identical, which demonstrates that a very weak field lens 1340 introduces little chromatic aberrations in the MWIR and LWIR bands.

Figure 17:
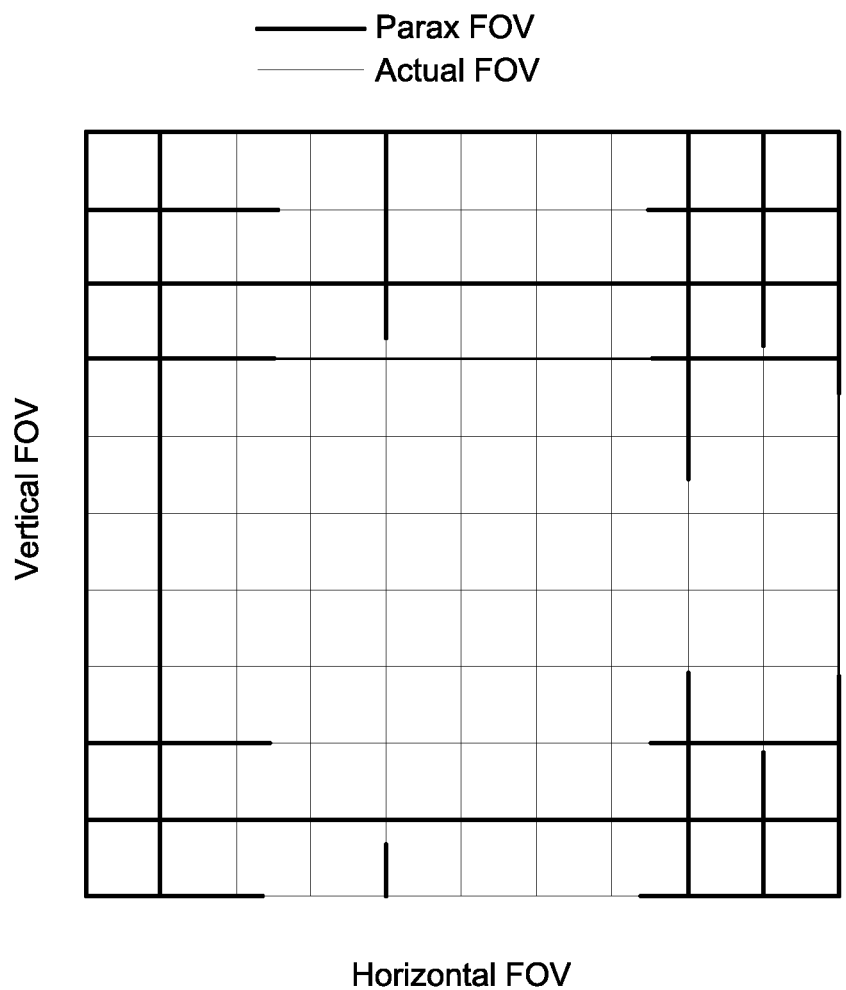
FIG. 17 is a diagram illustrating distortion characteristics of the example of the afocal telescope of FIG. 14.

FIG. 17 illustrates the distortion characteristic of the afocal telescope of FIG. 14 with the optical prescription given in FIG. 15. As with the four mirror telescope embodiment discussed above, the distortion is low and negative (barrel distortion). In FIG. 17, a square 2.5° field of view is shown.

Thus, aspects and embodiments demonstrate that the afocal telescope design for back-scanned systems may be optimized to minimize the imager wander on the focal plane array.

Simply minimizing the distortion is not sufficient as an ideal distortion-free telescope can exhibit significant image wander. In certain embodiments, the desired distortion is slightly negative, as presented above. Certain embodiments are directed to two different afocal design forms that each mitigate the image smearing, in particular, an optimized four mirror anastigmat form, and a three mirror anastigmat form that incorporates a field correcting lens group.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An optical imaging system configured for back-scanned imagery comprising:
    an imager including a focal plane array;
    an afocal telescope optically coupled to the imager and configured to receive and collimate electromagnetic radiation and to direct a collimated beam of the electromagnetic radiation via an exit pupil of the afocal telescope to the imager, the imager being configured to focus the electromagnetic radiation onto the focal plane array, and the focal plane array being configured to form an image from the electromagnetic radiation; and
    a back-scan mirror optically coupled to the afocal telescope and the imager, positioned proximate the exit pupil of the afocal telescope, and configured to back-scan the electromagnetic radiation to stabilize the image on the focal plane array,
    wherein the afocal telescope is configured as a four mirror anastigmat including a primary mirror, a secondary mirror, a tertiary mirror, and a field correcting mirror optically positioned between the secondary mirror and the tertiary mirror, the field correcting mirror being further positioned at an intermediate image plane of the afocal telescope and configured to adjust distortion characteristics of the afocal telescope to control image wander on the focal plane array for off-axis image points during the backscan.

2. The optical imaging system of claim 1, wherein the field correcting mirror is a near-flat aspheric mirror.

3. The optical imaging system of claim 2, wherein the primary mirror is positive powered, the secondary mirror is negative powered, and the tertiary mirror is positive powered.

4. The optical imaging system of claim 1, wherein the field correcting mirror is a deformable mirror, and the system further comprising a processor coupled to the deformable mirror and configured to control a shape of the deformable mirror to control the image wander during the backscan.

5. An optical imaging system configured for back-scanned imagery comprising:
    an imager including a focal plane array;
    an afocal telescope optically coupled to the imager, and configured to receive and collimate electromagnetic radiation and to direct a collimated beam of the electromagnetic radiation via an exit pupil of the afocal telescope to the imager, the imager being configured to focus the electromagnetic radiation onto the focal plane array, and the focal plane array being configured to form an image from the electromagnetic radiation, and the afocal telescope having an optical axis that passes through the exit pupil to the imager and being configured as a three mirror anastigmat including a primary mirror, a secondary mirror, and a tertiary mirror;

a back-scan mirror optically coupled to the afocal telescope and the imager, positioned proximate the exit pupil of the afocal telescope, and configured to back-scan the electromagnetic radiation to stabilize the image on the focal plane array; and an optical element positioned at an intermediate image plane of the afocal telescope and configured to adjust distortion characteristics of the afocal telescope to control image wander on the focal plane array for off-axis image points during the backscan.

6. The optical imaging system of claim 5, wherein the optical element is a field correcting lens group.

7. The optical imaging system of claim 6, wherein the field correcting lens group includes an aspherical lens that is decentered with respect to the optical axis of the afocal telescope.

8. The optical imaging system of claim 7, wherein the aspherical lens comprises zinc selenide.

9. The optical imaging system of claim 6, wherein the afocal telescope is configured for dual-band operation and the field correcting lens group includes at least first and second lens elements of different materials.

10. The optical imaging system of claim 9, wherein the afocal telescope is configured for operation in the MWIR and LWIR spectral bands.

11. The optical imaging system of claim 9, wherein the first lens element comprises zinc selenide.

12. The optical imaging system of claim 11, wherein the second lens element comprises one of zinc sulfide and germanium.

13. The optical imaging system of claim 6, wherein the primary mirror is positive powered, the secondary mirror is negative powered, and the tertiary mirror is positive powered.

14. The optical imaging system of claim 5, wherein the afocal telescope is configured with the exit pupil being off-axis relative to the optical axis.

15. A method of back-scanned imaging comprising:
collimating and directing electromagnetic radiation with an afocal telescope to an imager that includes a focal plane array;
forming an image from the electromagnetic radiation using the imager, the image being centered about an optical axis of the afocal telescope that passes through an exit pupil of the afocal telescope to the imager;
back-scanning the electromagnetic radiation with a back-scan mirror optically coupled to the afocal telescope and positioned proximate the exit pupil of the afocal telescope to stabilize the image on the focal plane array; and
adjusting distortion characteristics of the afocal telescope with an optical element positioned at an intermediate image plane of the afocal telescope to control image wander on a focal plane array of the imager for off-axis image points during the back-scanning operation;
wherein the afocal telescope is configured as a three mirror anastigmat; and
wherein adjusting the distortion characteristics of the afocal telescope includes providing the optical element including a field correcting lens group positioned proximate the intermediate image plane of the three mirror anastigmat.

16. The method of claim 15, wherein the afocal telescope is configured for dual-band operation, and wherein providing the optical element includes providing the field correcting lens group including at least two lens elements of different materials.

17. A method of back-scanned imaging comprising:
collimating and directing electromagnetic radiation with an afocal telescope to an imager that includes a focal plane array;
forming an image from the electromagnetic radiation using the imager, the image being centered about an optical axis of the afocal telescope that passes through an exit pupil of the afocal telescope to the imager;
back-scanning the electromagnetic radiation with a back-scan mirror optically coupled to the afocal telescope and positioned proximate the exit pupil of the afocal telescope to stabilize the image on the focal plane array; and
adjusting distortion characteristics of the afocal telescope with an optical element positioned at an intermediate image plane of the afocal telescope to control image wander on a focal plane array of the imager for off-axis image points during the back-scanning operation,
wherein the afocal telescope is configured as a four mirror anastigmat including the optical element; and
wherein adjusting the distortion characteristics of the afocal telescope includes providing the optical element including a field correcting mirror.

18. The method of claim 17, wherein the field correcting mirror is a deformable mirror, and wherein adjusting the distortion characteristics of the afocal telescope includes controlling, with a processor, a shape of the deformable mirror.

19. An optical imaging system configured for back-scanned imagery comprising:
an imager including a focal plane array;
an afocal telescope optically coupled to the imager, and configured to receive and collimate electromagnetic radiation and to direct a collimated beam of the electromagnetic radiation via an exit pupil of the afocal telescope to the imager, the imager being configured to focus the electromagnetic radiation onto the focal plane array, and the focal plane array being configured to form an image from the electromagnetic radiation, and the afocal telescope having an optical axis that passes through the exit pupil to the imager;
a back-scan mirror optically coupled to the afocal telescope and the imager, positioned proximate the exit pupil of the afocal telescope and configured to back-scan the electromagnetic radiation to stabilize the image on the focal plane array; and
an optical element positioned at an intermediate image plane of the afocal telescope and configured to adjust distortion characteristics of the afocal telescope to control image wander on the focal plane array for off-axis image points during the backscan;
wherein the afocal telescope is a four mirror anastigmat including a primary mirror, a secondary mirror, a tertiary mirror, and the optical element; and
wherein the optical element is a near-flat aspheric field correcting mirror optically positioned between the secondary mirror and the tertiary mirror.

* * * * *